United States Patent
Witts et al.

(10) Patent No.: US 11,772,629 B2
(45) Date of Patent: Oct. 3, 2023

(54) SYSTEM FOR SENSING A POSITION OF A FIRST MEMBER RELATIVE TO A SECOND MEMBER BASED ON A RADIO FREQUENCY CHARACTERISTIC OF A BIAS MEMBER

(71) Applicant: Kyocera AVX Components (Werne) GmbH, Werne (DE)

(72) Inventors: David Witts, Cambridge (GB); Olivier Pajona, Antibes (FR); Markus Frädrich, Werne an der Lippe (DE); Stefan Ruhl, Werne an der Lippe (DE); Stephane Proust, Cagnes-sur-Mer (FR); Jaakko Kyllonen, Antibes (FR); Jonathan Hayes, Cambridge (GB)

(73) Assignee: KYOCERA AVX COMPONENTS (WERNE) GMBH, Werne (DE)

( * ) Notice: Subject to any disclaimer, the term of this patent is extended or adjusted under 35 U.S.C. 154(b) by 0 days.

(21) Appl. No.: 17/388,740

(22) Filed: Jul. 29, 2021

(65) Prior Publication Data
US 2021/0354683 A1   Nov. 18, 2021

Related U.S. Application Data

(63) Continuation of application No. 16/874,810, filed on May 15, 2020, now abandoned.
(Continued)

(51) Int. Cl.
*B60W 50/00* (2006.01)
*B60W 10/198* (2012.01)
*G01S 13/10* (2006.01)

(52) U.S. Cl.
CPC .......... *B60W 10/198* (2013.01); *G01S 13/10* (2013.01); *B60W 2050/0057* (2013.01); *B60W 2510/0604* (2013.01); *B60W 2720/106* (2013.01)

(58) Field of Classification Search
CPC ....... B60W 10/198; B60W 2050/0057; B60W 2510/0604; B60W 2720/106; G01S 13/10
See application file for complete search history.

(56) References Cited

U.S. PATENT DOCUMENTS

| 5,793,175 A | * | 8/1998 | Journey | B60L 50/52 |
| | | | | 318/493 |
| 2002/0189329 A1 | | 12/2002 | Wimmer | |

(Continued)

FOREIGN PATENT DOCUMENTS

| DE | 102004032031 A1 | 1/2006 | |
| DE | 102007052162 A1 * | 5/2009 | ............... G01B 7/30 |

(Continued)

OTHER PUBLICATIONS

Bauer, English Translation of Description of DE102007052162A1, 2009 (original document), Espacenet (Year: 2009).*

*Primary Examiner* — Fadey S. Jabr
*Assistant Examiner* — Naeem Taslim Alam
(74) *Attorney, Agent, or Firm* — Dority & Manning, P.A.

(57) ABSTRACT

A system for sensing a position of a first member relative to a second member based on a radio frequency characteristic of a bias member is disclosed. The bias member may be configured to bias the second member relative to the first member. Radio frequency circuitry may be configured to apply a radio frequency signal to the bias member and provide one or more signals indicative of a position of the first member relative to the second member based on a radio frequency characteristic of the bias member.

15 Claims, 5 Drawing Sheets

Related U.S. Application Data

(60) Provisional application No. 62/857,298, filed on Jun. 5, 2019.

(56) References Cited

U.S. PATENT DOCUMENTS

| | | | |
|---|---|---|---|
| 2010/0037726 A1 | 2/2010 | Beck | |
| 2011/0036192 A1 | 2/2011 | Wolterman | |
| 2011/0056790 A1 | 3/2011 | Raber | |
| 2012/0138375 A1* | 6/2012 | Hughes | B60W 10/184 180/65.1 |
| 2012/0150377 A1* | 6/2012 | Buchheim | H02J 7/0018 301/6.5 |
| 2017/0207760 A1* | 7/2017 | Werking | G01P 15/125 |
| 2017/0336503 A1 | 11/2017 | Hammerschmidt | |
| 2021/0310837 A1* | 10/2021 | Lehmann | G01D 18/00 |

FOREIGN PATENT DOCUMENTS

| | | |
|---|---|---|
| DE | 102007052162 A1 | 5/2009 |
| KR | 20100064353 | 5/2010 |

\* cited by examiner

SYSTEM FOR SENSING A POSITION OF A FIRST MEMBER RELATIVE TO A SECOND MEMBER BASED ON A RADIO FREQUENCY CHARACTERISTIC OF A BIAS MEMBER

PRIORITY CLAIM

The present application is a continuation of U.S. application Ser. No. 16/874,810 having a filing date of May 15, 2020, titled "System for Sensing a Position of a First Member Relative to a Second Member Based on a Radio Frequency Characteristic of a Bias Member", which claims the benefit of priority of U.S. Provisional Application Ser. No. 62/857,298, filed on Jun. 5, 2019, titled "System for Sensing a Position of a First Member Relative to a Second Member Based on a Radio Frequency Characteristic of a Bias Member. Applicant claims priority to and the benefit of each of such applications and incorporate all such applications herein by reference in its entirety.

FIELD

The present disclosure relates generally to radio frequency sensors and related methods, and more specifically to systems and methods for sensing a position of a first member relative to a second member based on a radio frequency characteristic of a bias member.

BACKGROUND

Current position sensor systems for detecting relative position between two members can generally be complex and expensive. For example, some position sensors require additional mechanical components that can contact each of the members. Such systems can add undesirable resistance to relative movement between the members. Other position sensors may generally require precisely manufactured components, such as windings. Accordingly, an improved position sensor system would be welcomed in the art.

SUMMARY

Aspects and advantages of embodiments of the present disclosure will be set forth in part in the following description, or may be learned from the description, or may be learned through practice of the embodiments.

One example aspect of the present disclosure is directed to a system for sensing a position of a first member relative to a second member based on a radio frequency characteristic of a bias member. The bias member may be configured to bias the second member relative to the first member. Radio frequency circuitry may be configured to apply a radio frequency signal to the bias member and provide one or more signals indicative of a position of the first member relative to the second member based on a radio frequency characteristic of the bias member.

Another example aspect of the present disclosure is directed to a position sensor system for a vehicle pedal. The system may include a base member, a pedal member movable relative to the base member, and a bias member configured to bias the pedal member away from the base member. The system may include radio frequency circuitry configured to apply a radio frequency signal to the bias member and provide one or more signals indicative of a position of the base member relative to the pedal member based on a radio frequency characteristic of the bias member.

Another example aspect of the present disclosure is directed to a method for sensing a position of a first member relative to a second member. The method may include applying a radio frequency signal to a bias member that is configured to bias the second member relative to the first member; detecting a radio frequency characteristic of the bias member; and providing one or more signals indicative of a position of the first member relative to the second member based on the radio frequency characteristic of the bias member.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Example aspects of the present disclosure are directed to systems and methods for sensing a position of a first member relative to a second member based on a radio frequency characteristic of a bias member (e.g., a coil spring, or other resilient member). The bias member may be configured to bias the second member relative to the first member. Radio frequency (RF) circuitry may be configured to apply a radio frequency signal to the bias member and provide one or more signals indicative of a position of the first member relative to the second member based on a radio frequency characteristic of the bias member.

The radio frequency signal applied to the bias member can be reflected by the bias member. The reflected radio frequency signal can be detected by the radio frequency circuitry. The characteristics of the radio frequency signal(s) (e.g., amplitude, frequency, etc.) that is applied by the radio frequency circuitry may be selected based on one or more characteristics of the system. Example characteristics include dimensions or resonant frequencies of the bias member and/or any surrounding conductive structure. For instance, the radio frequency signal may have a frequency that corresponds with a resonant frequency of the bias member (e.g., a first resonant frequency, second resonant frequency, etc.).

The radio frequency circuitry, or radio frequency circuit, may include a radio frequency generator configured to apply the radio frequency signal to the bias member. The radio frequency circuit may also include a spectrum analyzer that is configured to detect the radio frequency characteristic of the bias member. For example, the spectrum analyzer may be configured to detect the reflected radio frequency circuit that is reflected by the bias member.

In some embodiments, the radio frequency generator and spectrum analyzer may be coupled with the bias member at the same location. For example, the radio frequency generator electrically may be coupled with the bias member at a first location of the bias member and configured to apply the radio frequency signal to the bias member at the first location. The spectrum analyzer may be electrically coupled with the bias member at the first location of the bias member and configured to detect the radio frequency signal reflected by the bias member at the first location. For example, the system may include a splitter connected with the frequency generator, spectrum analyzer, and/or the bias member such that each of the frequency generator and spectrum analyzer can be coupled with the bias member at the first location.

In other embodiments, however, the spectrum analyzer may be coupled with the bias member at a second location that is distinct or spaced apart from the first location. The second location may be defined at any location along the bias member. For instance, in one embodiment, the second location may be defined at an end of the bias member that is opposite the first location. In such embodiments, the radio frequency signal detected by the spectrum analyzer may correspond with an insertion loss ($S_{1,2}$) of the bias member.

Example aspects of the present disclosure are directed to a position sensor system for a vehicle pedal. For example, the system may be configured to detect the position of a pedal member, such as an accelerator pedal, brake pedal etc.

In some embodiments, the bias member may be coupled to each of the first member and second member. For example, the bias member may be configured to bias the second member away from the first member.

In some embodiments, the second member may be pivotally coupled to the first member.

In some embodiments, the bias member may be or include a coil spring.

In some embodiments, the radio frequency circuitry may include a radio frequency generator electrically coupled with the bias member at a first location of the bias member and configured to apply the radio frequency signal to the bias member at the first location.

In some embodiments, the radio frequency circuitry may include a spectrum analyzer electrically coupled with the bias member at the first location of the bias member location and configured to detect the radio frequency signal reflected by the bias member at the first location.

In some embodiments, the system may include a splitter having a first port, a second port, and a third port. The first port may be connected to the bias member at the first location. The second port may be connected to the frequency generator. The third port may be connected to the spectrum analyzer such that each of the frequency generator and spectrum analyzer are electrically coupled with the bias member at the first location.

In some embodiments, the radio frequency circuitry may include a spectrum analyzer that is configured to detect an amplitude of a reflected radio frequency signal reflected by the bias member.

In some embodiments, the signal(s) indicative of the position of the first member relative to the second member provided by the radio frequency circuitry may be positively correlated with the amplitude detected by the spectrum analyzer.

In some embodiments, the radio frequency signal may include a fixed amplitude sinusoidal signal. The fixed amplitude sinusoidal signal may have a frequency that ranges from about 50 MHz to about 5 GHz, in some embodiments from about 100 MHz to about 4 GHz, in some embodiments from about 150 MHz to about 2 GHz, and in some embodiments from about 200 MHz to about 1 GHz.

Another example aspect of the present disclosure is directed to a position sensor system for a vehicle pedal. The system may include a base member, a pedal member movable relative to the base member, and a bias member configured to bias the pedal member away from the base member. The system may include radio frequency circuitry configured to apply a radio frequency signal to the bias member and provide one or more signals indicative of a position of the base member relative to the pedal member based on a radio frequency characteristic of the bias member.

In some embodiments, the pedal member may include an accelerator pedal.

In some embodiments, the bias member may be coupled to each of the base member and pedal member.

In some embodiments, the pedal member may be pivotally coupled to the base member.

In some embodiments, the bias member may include a coil spring.

In some embodiments, the radio frequency circuitry may include a radio frequency generator electrically coupled with the bias member at a first location of the bias member and configured to apply the radio frequency signal to the bias member at the first location.

In some embodiments, the radio frequency circuitry may include a spectrum analyzer electrically coupled with the bias member at the first location of the bias member location and configured to detect the radio frequency signal reflected by the bias member at the first location.

In some embodiments, the system may include a splitter having a first port, a second port, and a third port. The first port may be connected to the bias member at the first location. The second port may be connected to the frequency generator. The third port may be connected to the spectrum analyzer such that each of the frequency generator and spectrum analyzer are electrically coupled with the bias member at the first location.

In some embodiments, the radio frequency circuity may include a spectrum analyzer configured to detect an amplitude of a reflected radio frequency signal reflected by the bias member.

In some embodiments, the signal(s) indicative of the position of the base member relative to the pedal member may be positively correlated with the amplitude detected by the spectrum analyzer.

In some embodiments, the radio frequency signal may include a fixed amplitude sinusoidal signal. For example, the fixed amplitude sinusoidal signal may have a frequency that ranges from about 50 MHz to about 2 GHz.

Another example aspect of the present disclosure is directed to a method for sensing a position of a first member relative to a second member. The method may include applying a radio frequency signal to a bias member that is configured to bias the second member relative to the first member; detecting a radio frequency characteristic of the bias member; and providing one or more signals indicative of a position of the first member relative to the second member based on the radio frequency characteristic of the bias member.

Figure 1:
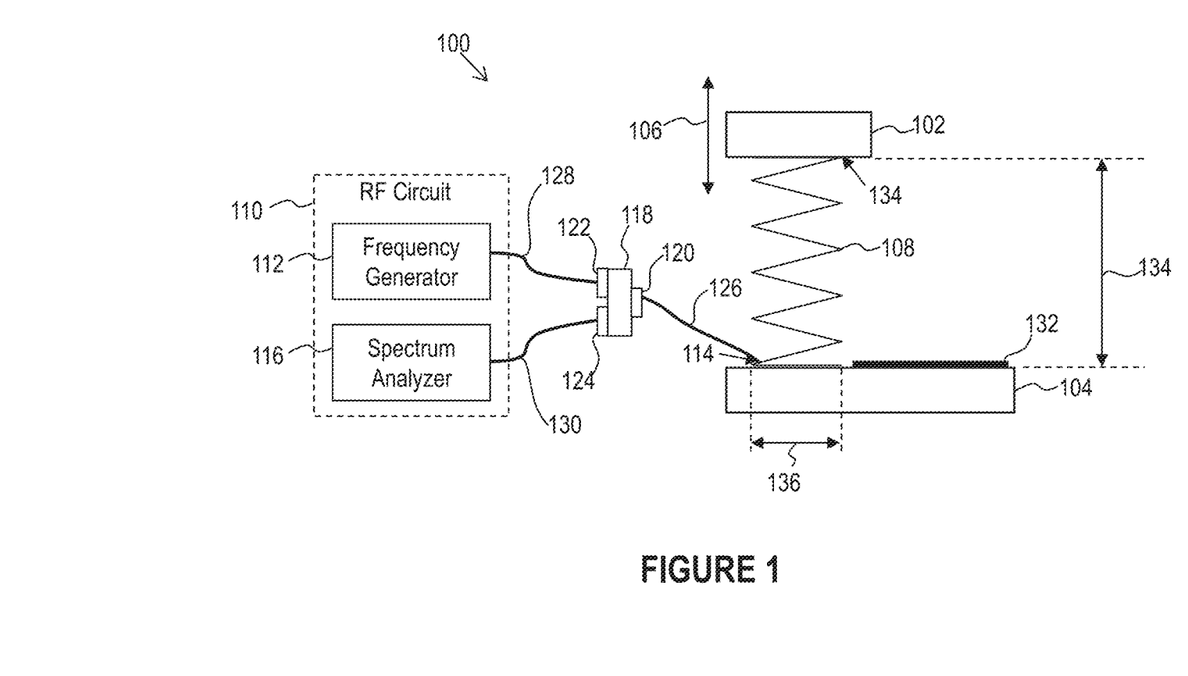
FIG. 1 depicts a schematic of select portions of an example inductive position sensor including radio frequency circuitry according to example embodiments of the present disclosure.

FIG. 1 is a schematic drawing of a position sensor system 100 according to aspects of the present disclosure. The system 100 may include a first member 102 and a second member 104 movable relative to the first member 102, for example as illustrated by arrow 106. A bias member 108 may be configured to bias the second member 104 relative to the first member 102. For example, bias member 108 may be configured to bias the second member 104 towards and/or away from the first member 102. The system 100 may include radio frequency circuitry, such as a radiofrequency circuit 110. The radiofrequency circuit 100 may be configured to apply a radio frequency signal to the bias member 108 and provide one or more signals indicative of a position of the first member 102 relative to the second member 104 based on a radio frequency characteristic of the bias member 108.

The bias member 108, first member 102, and second member 104 may have a variety of configurations. For example, the first member 102 may be directly coupled with the second member 104 (e.g., pivotally coupled). As another example, one or more additional members may be coupled with the first member 102 and/or second member 104 such that the first member 102 is articulated with respect to the second member 104. As another example, the first member 102 and/or second member 104 may be movable on a track or may have an articulated configuration such that the first member 102 is movable relative to the second member 104. In some embodiments, the first member 102 may be free of direct connection with the second member. In other embodiments, the first member 102 may be coupled (e.g., pivotally coupled) to the second member 104. The second member 104, however, may be movable relative to the first member 102 in any suitable known configuration.

The bias member 108 may have a variety of configurations. For example, the bias member 108 may be a spring having a helical or conical configuration. In other embodiments, however, the bias member 108 may be configured as a leaf spring (for examples as described with reference to FIG. 3) or any other suitable resilient member.

The radiofrequency circuit 110 may include a radio frequency generator 112 electrically coupled with the bias member 108 at a first location 114 of the bias member 108 and configured to apply the radio frequency signal to the bias member 108 at the first location 114. The radio frequency generator 112 may be configured to apply the radio frequency signal to the bias member 108 at the first location 114. The radio frequency signal may have a variety of suitable attributes, such as frequency, amplitude, modulation, etc. For example, the radio frequency signal may include a fixed amplitude sinusoidal signal. The fixed amplitude sinusoidal signal may have a frequency that ranges from about 50 MHz to about 2 GHz.

The characteristics of the radio frequency signal (e.g., amplitude, frequency, etc.) applied by the radio frequency generator 112 may be selected based on characteristics of the system 100. Example characteristics include size or resonant frequencies of the bias member 108 and/or any surrounding conductive structure.

The radiofrequency circuit 110 may include a spectrum analyzer 116 that is electrically coupled with the bias member 108 at the first location 114 of the bias member 108 and configured to detect the radio frequency signal reflected by the bias member 108 at the first location 114, for example as described in greater detail below.

The system 100 may include a splitter 118 having a first port 120, a second port 122, and a third port 124. The first port 120 of the splitter 118 may be connected to the bias member 108 at the first location 114 (e.g., by a first cable 126). The second port 122 of the splitter 118 may be connected to the frequency generator 112 (e.g., by a second cable 128). The third port 124 may be connected to the spectrum analyzer 116 (e.g., by a third cable 130) such that each of the frequency generator 112 and spectrum analyzer 116 are electrically coupled with the bias member 108 at the first location 114.

The first location 114 may be located at an end of the bias member 108, for example as illustrated in FIG. 1. In other embodiments, however, the first location 114 may be located at any suitable location along the bias member 108, for example at a middle location of the bias member 108. Alternatively, the radiofrequency circuit 110 may be coupled with a conductive member that is electrically coupled with the bias member 108. For example, the first member 102 and/or second member 104 may be conductive and electrically coupled with the bias member 108. The radiofrequency circuit 110 may be coupled with the first member 102 and/or second member 104 or otherwise located sufficiently near the bias member 108 to facilitate connection with the bias member 108.

The system 100 may include a conductive ground layer 132 arranged proximate the bias member 108. As used herein, "proximate" can refer to a distance that is sufficiently small such that the presence of the conductive ground layer 132 affects the radio frequency characteristic of the bias member 108 by a measurable amount. For example, the conductive ground layer 132 may be spaced apart from the bias member 108 by a distance that is less than a length 134 of the bias member 108. Alternatively, the conductive ground layer 132 may be spaced apart from the bias member 108 by a distance that is less than a width 136 of the bias member 108. The conductive ground layer 132 may be coupled to the first member 102, second member 104, or another suitable surrounding structure near the bias member 108.

The spectrum analyzer 116 may configured to detect and/or analyze the radio frequency characteristic of the bias member 108. For example, the spectrum analyzer 116 may be configured to detect and/or analyze radio frequency signals received via the third cable 130. Example radio frequency characteristics include frequency, amplitude, DC bias, or other characteristics of the received radio frequency signals. For instance, the radio frequency characteristic may include an amplitude of a reflected radio frequency signal that is reflected by, the bias member 108. In this example, the reflected radio frequency signal may correspond with a return loss ($S_{11}$) of the bias member 108. The signals indicative of the position of the first member 102 relative to the second member 104 may be positively correlated with the amplitude detected by the spectrum analyzer 116.

In other embodiments, however, the spectrum analyzer 116 may be coupled with the bias member 108 at a second location that is distinct or spaced apart from the first location 114. The second location may be defined at any location along the bias member 108. For instance, in one embodiment, the second location may be defined at an end 134 of the bias member 108 that is opposite the first location 114. In such embodiments, the radio frequency signal detected by the spectrum analyzer 116 may correspond with an insertion loss ($S_{1,2}$) of the bias member 108.

Figure 2:
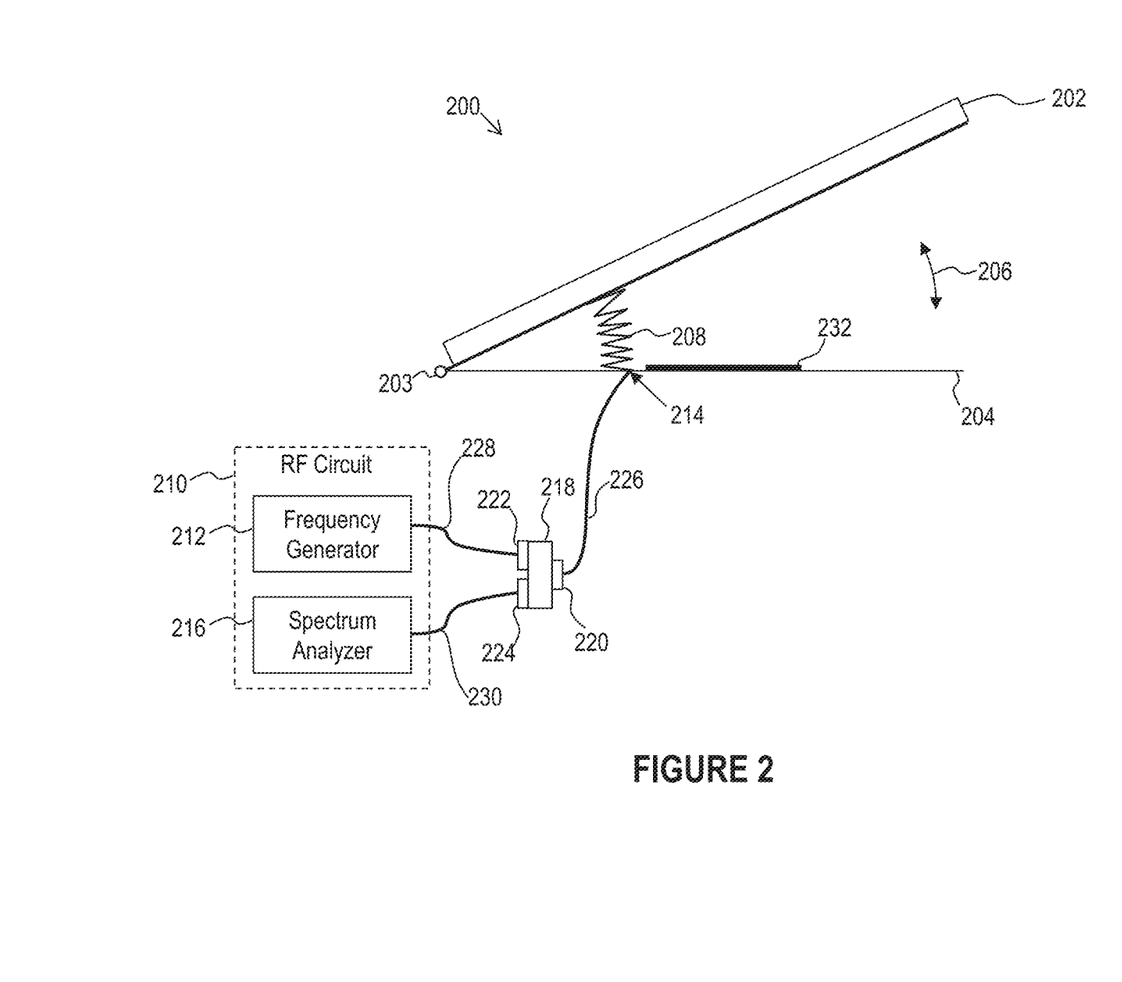
FIG. 2 depicts a schematic of the example inductive position sensor of FIG. 1 including an example configuration of a transmit aerial, a receive aerial and a member having a ferrite coating according to example embodiments of the present disclosure.

FIG. 2 is a schematic illustration of a position sensor system 200 for a vehicle pedal. For example, the pedal member 202 may be or include an accelerator pedal for a vehicle. The system 200 may be generally configured as the system 100 described above with respect to FIG. 1. For example, the system 200 may include a base member 204 and a pedal member 202 movable relative to the base member 204, for example as illustrated by arrow 206. The bias member 208 may be coupled to each of the base member 204 and the pedal member 202. The pedal member 202 may be pivotally coupled to the base member 204, for example at a pivot location 203. Thus, the bias member 208 may be configured to bias the pedal member 202 away from the base member 204, for example towards an uncompressed position.

The system 200 may include radio frequency circuitry, such as a radio frequency circuit 210, for example as described with reference to the radio frequency circuit 100 of FIG. 1. The radio frequency circuit 210 may be configured to apply a radio frequency signal to the bias member 208. The radio frequency circuit 210 may be configured provide one or more signals indicative of the position of the pedal member 202 relative to the base member 204 based on a radio frequency characteristic of the bias member 208. For example, the radio frequency circuit 200 may include a radio frequency generator 212 electrically coupled with the bias member 208 at a first location 214 of the bias member 208 and configured to apply the radio frequency signal to the bias member 208 at the first location 214. The radio frequency circuit 210 may include a spectrum analyzer 216 electrically coupled with the bias member 208 at the first location 214 of the bias member 208 and configured to detect the radio frequency signal reflected by the bias member 208 at the first location 214.

The system 200 may include a splitter 218, for example as described above with reference to the splitter 118 of FIG. 1. The splitter 218 may be connected with the frequency generator 212, spectrum analyzer 216, and/or the bias member 208, for example as described above with reference to the splitter 118 of FIG. 1.

The system 200 may include a conductive ground layer 232, for example as described with reference to the conductive ground layer 132 of FIG. 1. The conductive ground layer 232 may be proximate the bias member 208 such that the conductive ground layer 232 affects the radio frequency characteristic of the bias member 208. The conductive ground layer 232 may be spaced apart from the bias member 208 by a distance that is less than a length of the bias member 208. Alternatively, the conductive ground layer 232 may be spaced apart from the bias member 208 by a distance that is less than a width of the bias member 208. The conductive ground layer 232 may be coupled to the base member 204 or pedal member 202, or another suitable surrounding structure near the bias member 208.

Figure 3:
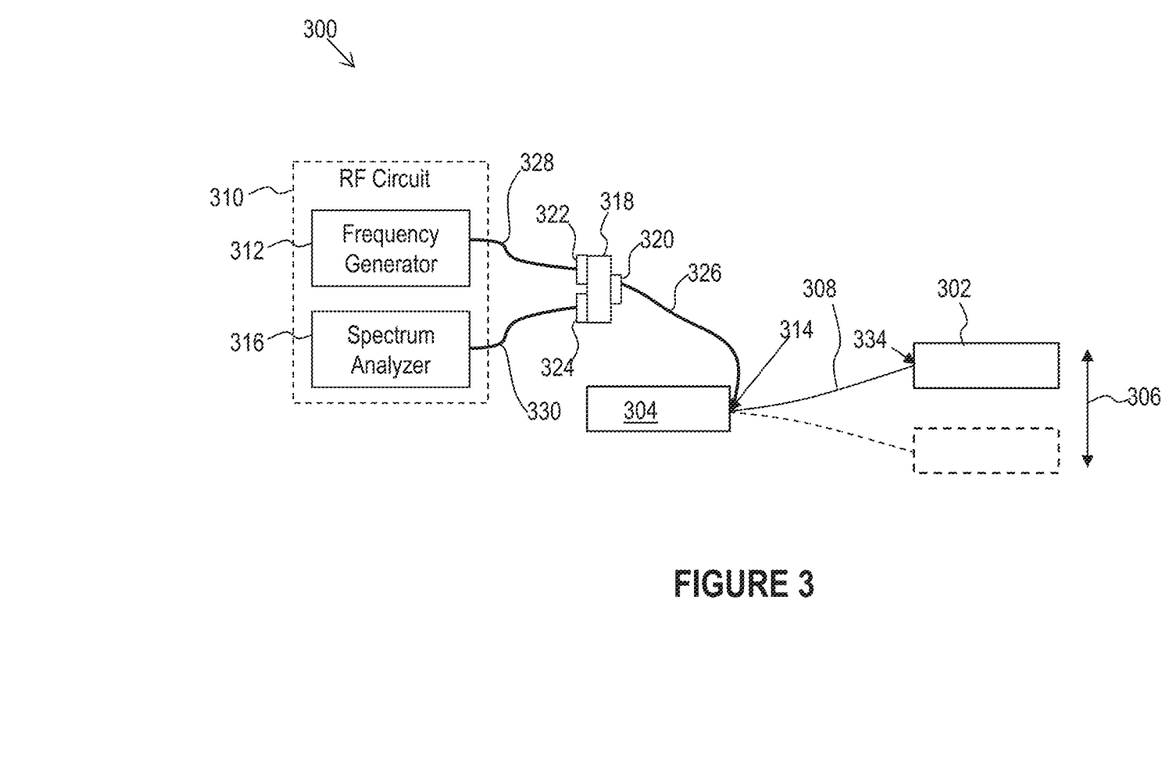
FIG. 3 is a schematic drawing of another embodiment of a position sensor system employing a leaf spring bias member according to aspects of the present disclosure

FIG. 3 is a schematic drawing of another embodiment of a position sensor system 300 employing a leaf spring bias member 308 according to aspects of the present disclosure. The position sensor system 300 may generally be configured as the position sensor system 100 described above with reference to FIG. 1 except that the leaf spring bias member 308 may be employed. The reference numerals of FIG. 3 may generally correspond with the reference numerals of FIG. 1. As shown in FIG. 3, movement of the first member 302 relative to the second member 304 may cause deflection of the leaf spring bias member 308. The leaf spring bias member 308 may be coupled with the first and second members 302, 304 in a cantilever configuration. The first member 302 may be coupled at one end of the leaf spring bias member 308. The second member 304 may be coupled at an opposite end of the leaf spring bias member 308. However, it should be understood that other suitable configurations may be employed. For example, the first or second member 302, 304 may be coupled with the leaf spring bias member 308 at an intermediate position (e.g., at a middle of the leaf spring bias member 308). In such configurations, one or more of the ends of the leaf spring bias member 308 may be mounted to supporting structure.

The radiofrequency circuit 310 may be configured to apply a radio frequency signal to the leaf spring bias member 308 and provide one or more signals indicative of a position of the first member 302 relative to the second member 304 based on a radio frequency characteristic of the leaf spring bias member 308, for example as described above with reference to FIGS. 1 and 2. It should be understood that the bias member may have other configurations.

Figure 4:
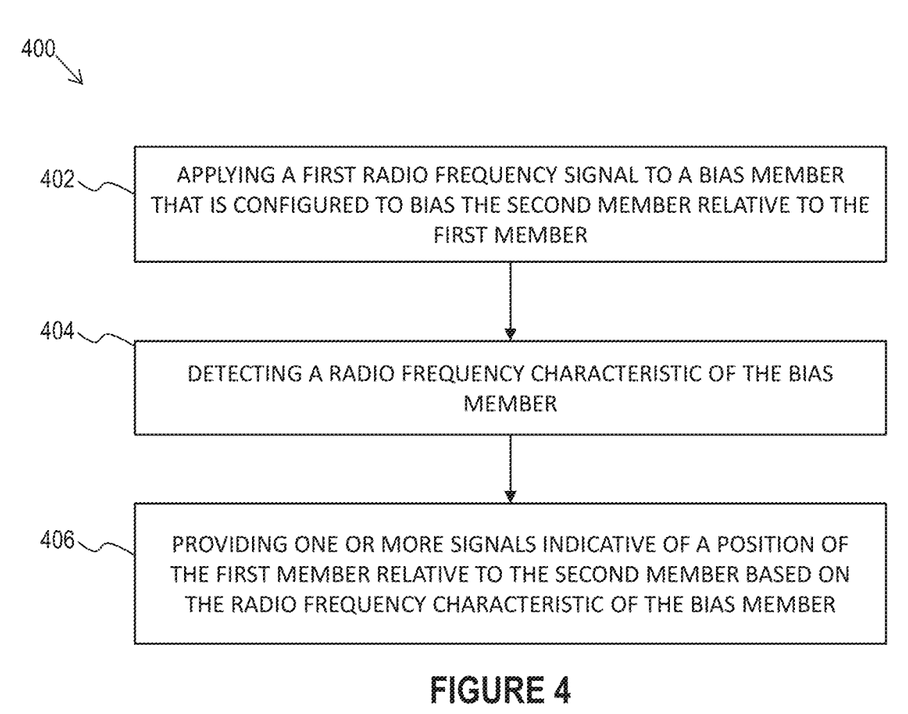
FIG. 4 depicts a flow diagram of an embodiment of a method for sensing a position of a first member relative to a second member according to aspects of the present disclosure.

FIG. 4 illustrates a flow diagram of an embodiment of a method 400 for sensing a position of a first member relative to a second member according to aspects of the present disclosure. Although FIG. 3 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure. Moreover, the method 400 may be described herein with reference to the sensor assemblies 100, 200, 300 described above with reference to FIGS. 1 through 3. However, it should be appreciated that the disclosed method 400 may be used for sensing a position of a first member relative to a second member using a bias member having any other suitable configuration.

The method 400 may include, at (402), applying a radio frequency signal to a bias member that is configured to bias the second member relative to the first member, for example as described above with reference to the sensor assemblies 100, 200 of FIGS. 1 and 2.

The method 400 may include, at (404), detecting a radio frequency characteristic of the bias member. Example radio frequency characteristics include frequency, amplitude, dc bias or other characteristics of the received radio frequency signals. For instance, the radio frequency characteristic may include an amplitude of a reflected radio frequency signal that is reflected by the bias member 108, for example as described above with reference to the sensor assemblies 100, 200 of FIGS. 1 and 2.

The method 400 may include, at (406), providing one or more signals indicative of a position of the first member relative to the second member based on the radio frequency characteristic of the bias member, for example as described above with reference to the sensor assemblies 100, 200, 300 of FIGS. 1 through 3.

Example

Figure 5:
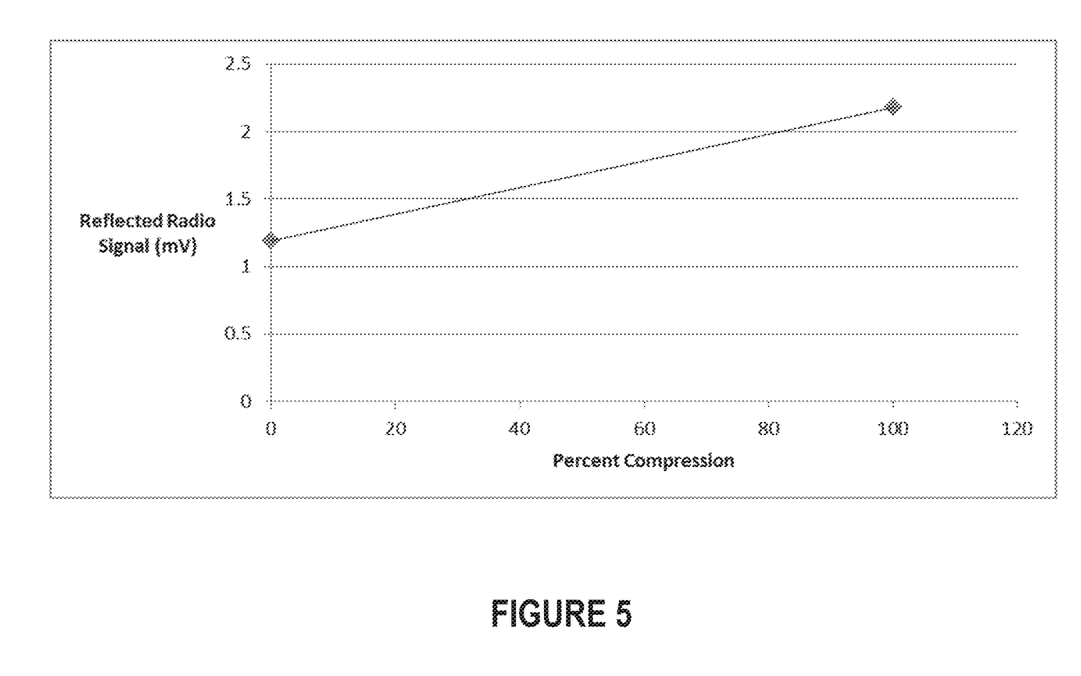
FIG. 5 is a plot of experimental data collected for a pedal sensor assembly similar to the pedal assembly of FIG. 2.

FIG. 5 illustrates experimental data collected for a pedal sensor assembly that was fabricated similar to the pedal assembly 200 of FIG. 2. A radiofrequency signal having a frequency of about 656 MHz was applied to the bias member at a first location. The radiofrequency circuit detected the amplitude of a reflected radiofrequency circuit at the first location. It was discovered that the reflected radio signal (vertical axis) was approximately linearly positively correlated with the compression of the bias member (horizontal axis). In an uncompressed position (0% compression), a sinusoidal signal having a frequency of about 656 MHz and an amplitude of about 1.19 mV was detected. In a fully compressed position (100% compression), a sinusoidal signal having a frequency of about 656 MHz and an amplitude of about 2.18 mV was detected.

The radio frequency circuitry can include processing circuitry configured to calculate the percent compression of the bias member based on the detected amplitude of the reflected radio frequency signal. For instance, the processing circuitry can employ a lookup table, a correlating formula (e.g., empirically or theoretically determined), and/or any other suitable means for calculating the percent compression based on the amplitude of the reflected radio frequency signal.

While the present subject matter has been described in detail with respect to specific example embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A position sensor system comprising:
   a first member;
   a second member movable relative to the first member;
   a bias member configured to bias the second member relative to the first member; and
   radio frequency circuitry configured to apply a radio frequency signal to the bias member and provide one or more signals indicative of a position of the first member relative to the second member based on a radio frequency characteristic of the bias member;
   wherein the radio frequency circuitry comprises a spectrum analyzer configured to detect an amplitude of a reflected radio frequency signal reflected by the bias member;
   wherein the one or more signals indicative of the position of the first member relative to the second member provided by the radio frequency circuitry are positively correlated with the amplitude detected by the spectrum analyzer.

2. The position sensor system of claim 1, wherein the bias member is coupled to each of the first member and second member.

3. The position sensor system of claim 1, wherein the bias member is configured to bias the second member away from the first member.

4. The position sensor system of claim 1, wherein the second member is pivotally coupled to the first member.

5. The position sensor system of claim 1, wherein the bias member comprises a coil spring.

6. The position sensor system of claim 1, wherein the radio frequency circuitry comprises a radio frequency generator electrically coupled with the bias member at a first location of the bias member and configured to apply the radio frequency signal to the bias member at the first location.

7. The position sensor system of claim 1, further comprising a splitter having a first port, a second port, and a third port, and wherein the first port is connected to the bias member at the first location, and wherein the second port is connected to the frequency generator, and wherein the third port is connected to the spectrum analyzer such that each of the frequency generator and spectrum analyzer are electrically coupled with the bias member at the first location.

8. The position sensor system of claim 1, wherein the radio frequency signal comprises a fixed amplitude sinusoidal signal.

9. The position sensor system of claim 8, wherein the fixed amplitude sinusoidal signal has a frequency that ranges from 50 MHz to 2 GHz.

10. A position sensor system for a vehicle pedal comprising:
    a base member;
    a pedal member movable relative to the base member;
    a bias member configured to bias the pedal member away from the base member;
    radio frequency circuitry configured to apply a radio frequency signal to the bias member and provide one or more signals indicative of a position of the base member relative to the pedal member based on a radio frequency characteristic of the bias member;
    wherein the radio frequency circuitry comprises a spectrum analyzer configured to detect an amplitude of a reflected radio frequency signal reflected by the bias member, wherein the one or more signals indicative of the position of the base member relative to the pedal member are positively correlated with the amplitude detected by the spectrum analyzer.

11. The position sensor system of claim 10, wherein the pedal member comprises an accelerator pedal.

12. The position sensor system of claim 10, wherein the bias member is coupled to each of the base member and pedal member, wherein the pedal member is pivotally coupled to the base member.

13. The position sensor system of claim 10, wherein the bias member comprises a coil spring.

14. The position sensor system of claim 10, wherein the radio frequency circuitry comprises a radio frequency generator electrically coupled with the bias member at a first location of the bias member and configured to apply the radio frequency signal to the bias member at the first location.

15. The position sensor system of claim 14, wherein the position sensor system further comprises a splitter having a first port, a second port, and a third port, and wherein the first port is connected to the bias member at the first location, and wherein the second port is connected to the frequency generator, and wherein the third port is connected to the spectrum analyzer such that each of the frequency generator and spectrum analyzer are electrically coupled with the bias member at the first location.

* * * * *